April 11, 1967  J. W. REBBECK  3,313,147
NON-DESTRUCTIVE TESTING OF STRUCTURES
Filed April 27, 1964  2 Sheets-Sheet 2

INVENTOR.
James W. Rebbeck
BY Burton Rodney
ATTORNEY

United States Patent Office 3,313,147
Patented Apr. 11, 1967

3,313,147
NON-DESTRUCTIVE TESTING OF STRUCTURES
James W. Rebbeck, Freeland, Mich., assignor to The Dow Chemical Company, Midland, Mich., a corporation of Delaware
Filed Apr. 27, 1964, Ser. No. 362,659
2 Claims. (Cl. 73—88)

This invention relates to the testing of structures and, more particularly, is concerned with the non-destructive strength testing of structural members.

When a structural member, metallic or otherwise, is submitted to a gradually increasing stressing action, the structural member begins to deform under the load. This can be seen by plotting resultant stress versus strain applied to said member. The plot of stress versus strain obtained is a straight line up to a certain stress. When this plot deviates in slope, i.e., when stress is no longer proportional to strain, the elastic limit of the structural member has been reached. If the stressing action on the member is continued beyond its elastic limit, the member is permanently deformed.

Ordinarily with new structural materials or configurations, a number of representative members are tested to destruction and the stress versus strain data obtained from these tests are studied to determine on a statistical basis the elastic limit, the proportional limit, the yield point, the rupturing point and the like, of the members of the class. These properties, subsequently, ordinarily are assigned as being the values for like members. However, it readily can be seen that such a test is a destructive one in that the structural members so tested are permanently deformed and in many cases destroyed in determining the elastic limit.

Further, this conventional method assumes that other like members of the class have the same properties e.g., elastic limit, as shown by the average values of those tested. By the conventional method, therefore, one cannot be assured of knowing the true elastic limit of any particular structural member in a specific group.

I have invented a novel non-destructive method and apparatus for the strength testing of structural members wherein a structural member can be tested until its elastic limit has been reached. The test can then be terminated at about said elastic limit so that the structural member tested is not permanently deformed. For some purposes as in doing a limited amount of mechanical working of the structure under test, the test can be continued beyond the elastic limit to a predetermined limit.

The term "structural member," as used herein, includes metallic and non-metallic rods, bars, wire, cable, beams, reinforced or otherwise, columns, poles, brackets, clamps, tubes, pipes, girders, concrete articles, reinforced or otherwise, airplane wings, airplane landing gear, other airplane parts, structures designed for space flight such as those used in missiles and rockets, supporting and restraining means and the like.

The term "stressing action," as used herein, includes tensile forces, compression forces, shearing forces, bending forces and torsional forces.

It is a principal object of the instant invention to provide a method and apparatus for the non-destructive strength testing of structural members.

It is a further object of the instant invention to provide a test method whereby the elastic limit of a structural member under test is readily detectable during the test.

It is also an object of the present invention to provide a method and apparatus for non-destructively testing the strength of both used and newly designed structural members to determine the safe operating load which such structural members can withstand.

Another object is to provide a test method and apparatus wherein the elastic limit of a metallic structural member can be measured and the test terminated at some predetermined load beyond the elastic limit of the structural member under test thereby working the structural member a predetermined amount and thus controlling its ultimate strength.

The foregoing and other advantages and objects of the present invention will become apparent from the detailed description presented hereinafter and by reference to the accompanying drawings.

Figure 1:
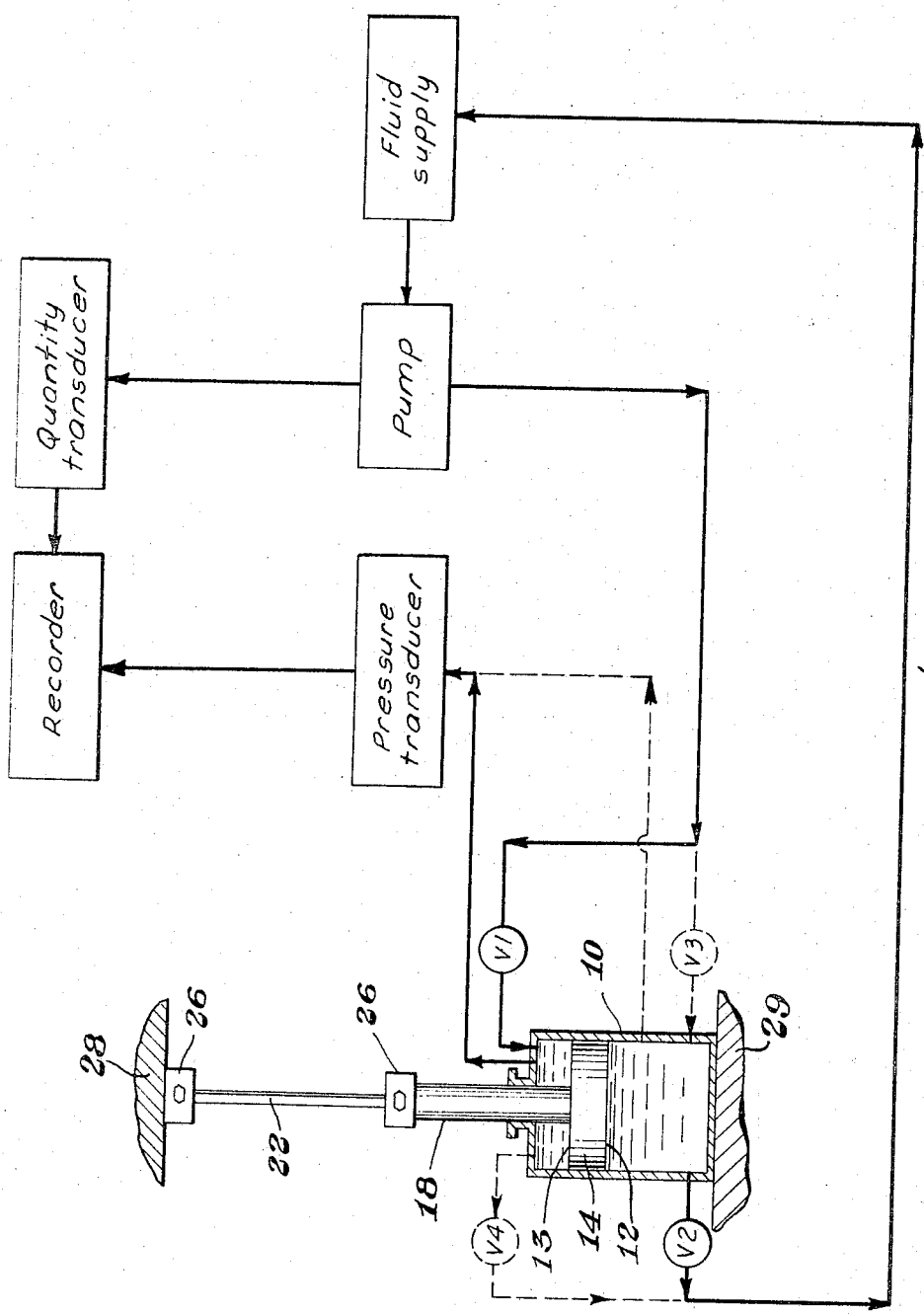
FIGURE 1 shows schematically one embodiment of the method and apparatus of the instant invention arranged as in making a tensile strength test of a structural member in the form of a bar. The dashed lines in FIGURE 1 show an alternative embodiment of this same method and apparatus as used in compression testing.

In general, referring to the figures wherein like numerals represent like parts in the several views, in FIGURE 1, the apparatus of the instant invention for the non-destructive testing of a structural member comprises a hydraulic cylinder 10, piston 14, piston-rod 18 combination, said piston slidably engaging the inner walls of the hydraulic cylinder. The cylinder and associated elements thereof are of sufficient strength to be capable of taking a load imposed thereon without reaching the elastic limit of any element of the combination. Means to support or engage a structural member 22 to be tested are attached to member 22 and to the piston-rod 18. As, for example, in FIGURE 1, clamps 26 rigidly affix the member 22 to a firm support 28 and to said piston-rod. The cylinder 10 is attached to a firm foundation 29. A pump for delivery of fluids under pressure is connected to a fluid supply and to the hydraulic cylinder as shown. A quantity transducer which measures the quantity of fluid pumped and a pressure transducer which measures the fluid pressure on the piston are connected to a recorder. The pressure transducer is in turn connected to the hydraulic cylinder 10 and the quantity transducer is connected to the pump as shown.

Figure 2:
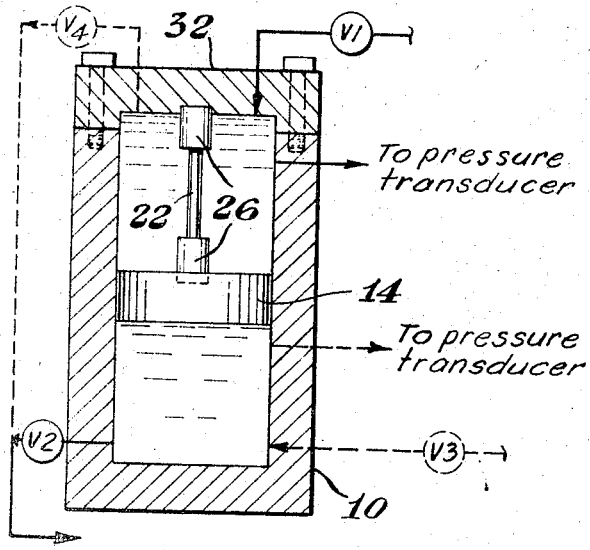
FIGURE 2 is a sectional view of another embodiment of a piston-cylinder apparatus for use in the system depicted in FIGURE 1.

FIGURE 2 shows a piston-hydraulic cylinder combination which can be used with the fluid system set forth in FIGURE 1 in which the structural member 22 to be tested is clamped at one end to the piston 14 and at the other end to the inside of one end of the cylinder which has a removable head 32.

In the preferred embodiment of the instant test apparatus as shown in FIGURE 1, the internal pressure in the hydraulic cylinder 10 against the piston 14, as a function of the quantity of fluid introduced into the fluid-filled portion of the hydraulic cylinder, is automatically plotted as a single line graphic record on the recorder thereby visually and/or automatically ascertaining the pressure at which the plot deviates from a straight line and thus providing for determination of the elastic limit of the structural member 22 undergoing test from said record and pressure.

In accordance with the method of the instant invention, an apparatus with attached structural member 22 to be tested is assembled as shown in FIGURE 1 or 2. The structural member is connected to support or engaging means 26 on the piston-rod 18 (as in FIGURE 1) or piston 14 (as in FIGURE 2) so as to apply the motion of the piston to the member and thereby stress the member. The member is rigidly supported at a point remote from the application of the motion of the piston as shown. A substantially incompressible fluid is then pumped into the interior of said hydraulic cylinder against one face of the piston so as to fill the space formed between said piston face and the end of said cylinder. Additional fluid is pumped into said cylinder against the piston causing said piston to be moved within said cylinder thereby subjecting said structural member to a stressing action. The quantity of fluid introduced into the cylinder, after the space between said piston face and the end of said cylinder is filled with said fluid and the resulting increase in pressure in the cylinder is monitored and continuously correlated as the test proceeds thereby ascertaining the stress action on said structural member. The point at which the presure in the cylinder against said piston is not proportional to the quantity of fluid introduced into the cylinder is determined thereby to detect the elastic limit of said structural member. The introduction of said fluid into said cylinder is discontinued at about said elastic limit of said structural member.

Figure 6:
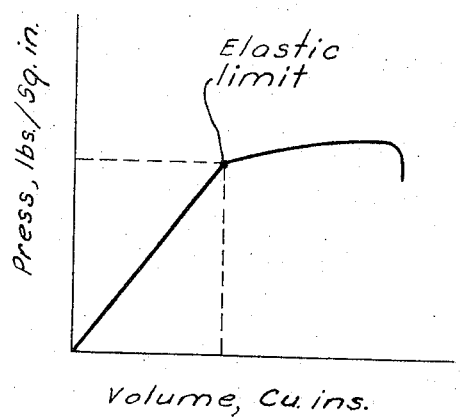
FIGURE 6 shows a typical record of a tensile test conducted on a metallic structural member in accordance with the method of the instant invention using an apparatus assembly similar to that shown in FIGURE 1.

In the tensile testing of a structural member using the apparatus as assembled in FIGURE 1, a substantially incompressible liquid is pumped into said hydraulic cylinder so as to fill the space between the top face of said piston, i.e., the piston face from which said piston-rod or structural member extends and the top end of said cylinder, by opening valves 1 and 2 and closing valves 3 and 4. The pressure transducer is in communication with the liquid contained in said cylinder between the top face of said piston and the top of said cylinder. As increasing quantities of liquid are introduced into said cylinder, the pressure on the top face of the piston increases thereby forcing the piston down the cylinder and producing a resultant force on the piston-rod. As the piston moves downward, the structural member under test starts to deform. The pressure on the top face of said piston is detected and translated into a usable form for recording by the pressure transducer. The amount of fluid pumped into said hydraulic cylinder is detected and translated into a usable form for recording by the quantity transducer. The pressure on said piston as a function of quantity of liquid introduced into the cylinder is recorded on a recorder thereby ascertaining the stressing action on said structural member. When the pressure in said cylinder and the quantity of liquid introduced into said cylinder are no longer proportional to one another as shown on the recording by a deviation in slope from a straight line, the elastic limit of the structural member has been reached (see FIGURE 6). In order to make this method a substantially non-destructive method, the introduction of liquid into said cylinder is discontinued at or about the elastic limit of said structural member.

In submitting a structural member to a compression test using the instant apparatus and method, fluid is pumped into said cylinder so as to fill the space between the bottom face of the piston and the bottom face of said cylinder by opening valves 3 and 4 and closing valves 1 and 2. The remainder of this compression test method is similar to that described in tensile testing.

Figure 3:
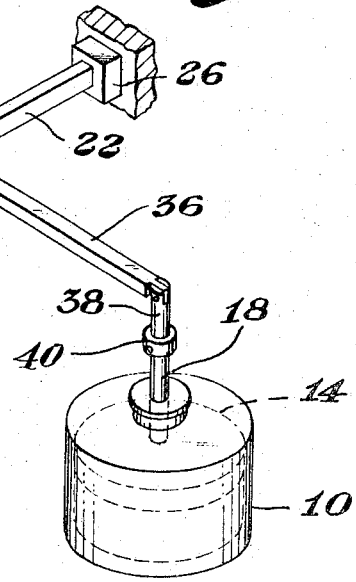
FIGURE 3 is a side view of a piston-rod, piston, hydraulic cylinder combination for use in the system of the instant invention depicted in FIGURE 1 when testing the torsion strength of a structural member.

A structural member can also be tested for torsion strength using the instant apparatus and method. The apparatus as shown in FIGURE 1 can be slightly modified as shown by the detail view in FIGURE 3 of said piston-rod 18, piston 14, hydraulic cylinder 10 combination. In this application, the structural member 22 to be tested, in this case a rod, is supported in a plane at approximately a right angle to said piston-rod by support fixed means 26, the other end 33 being supported by pivot 34 on fixed support 35, and is in communication with said piston-rod via an elongated member or shaft 36. One end of the elongated member 36 is rigidly affixed to the structural member, the other end being pivotally connected to the upper end of piston-rod 18 by pivot 40. As fluid is pumped into said cylinder, either against the top face or bottom face of said piston, the resultant force on said piston-rod and elongated member provides a torsion stress on said structural member.

Figure 4:
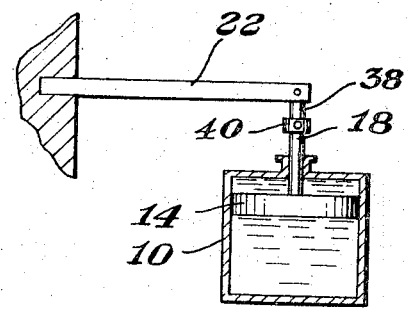
FIGURE 4 is a side view of another embodiment of a piston, piston-rod, hydraulic cylinder with structural test member mounted thereon for use in the present novel process.

FIGURE 4 is another embodiment of the instant invention for testing a cantilever in bending. This embodiment has especial utility in testing air frame members or composite structures in cantilever form. In this embodiment, the structural member 22 to be tested is firmly supported at one end and is pivoted at its free end to a connecting rod 38 which is pivotally connected to the upper end of piston-rod 18 by pivot 40. Once again, fluid can be pumped into said cylinder against either the top face or against the bottom face of said piston.

Figure 5:
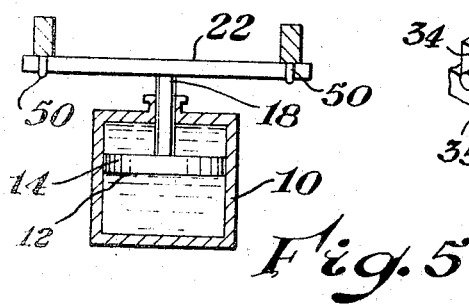
FIGURE 5 is a side elevation of a schematic sectional view of the apparatus applied to the testing of a beam or the like in bending.

FIGURE 5 is another embodiment of the instant invention for testing beams, rods, other elongated members and the like in bending. In this embodiment, the member 22 to be tested is supported at both ends against upward movement and is prevented from falling by hooks 50. The member is desirably positioned directly over piston-rod 18 as shown. Fluid is pumped into said cylinder 10 against the bottom face 12 of said piston 14.

The remaining steps of the torsion (FIGURE 3) and bending tests (FIGURES 4 and 5) are carried out in accordance with the procedure described hereinbefore in the discussion of the system of FIGURE 1.

In each of the aforedescribed hydraulic cylinder-piston combinations, there is substantially no leakage between the piston and the inner walls of said cylinder.

The actual fluid pressure used in each of the aforementioned cylinder-piston combinations depends upon the piston diameter and the load to be applied and can be quite small. However, it is desirable for said cylinder-piston and piston-rod combinations to be very rugged so that deformations in these elements are relatively negligible as compared to the distension produced in the structure under test.

After the elastic limit of the structural member undergoing test has been determined, the test can be continued or subsequent tests can be worked on the same structural member. The tests can be terminated by discontinuing the introduction of liquid into said hydraulic cylinder at some predetermined pressure computed to produce a stress, at or about or below the elastic limit of said structural member. When the test is terminated at a predetermined pressure beyond the elastic limit, the structural member (if metallic) as a material is cold worked and its strength thereby increased, e.g., to 110 percent or more of the specified metallic yield strength of the structure member.

The actual load placed upon a structural member under test at its elastic limit or at any other point can be determined from the diameter of said piston and the pressure applied to said piston at said elastic limit or other point as is conventionally calculated.

The elastic limit of a particular structural member being tested by the method and the apparatus of the instant invention can be automatically determined, for example, electrically, photoelectrically or mechanically.

An illustrative photoelectric method for automatically determining the elastic limit of a structural member being tested by the present novel method and apparatus resides in attaching photoelectric means to the stylus of a recorder as described in U.S. Patent No. 3,057,185, issued Oct. 9, 1962. The photoelectric means can follow along the pressure-quantity of fluid line on the recorder. When the structural member is within its elastic limit, this line is of constant slope. As the elastic limit is reached and just surpassed, the pressure-quantity line changes in slope. The photoelectric means automatically senses this deviation and activates a mechanical signaler, for example, a bell, a light or a meter to indicate that the elastic limit of the structural member has been reached.

In addition, the elastic limit of the structural member under test can be determined manually by use of a "Trend Detector" disclosed in U.S. patent application Ser. No. 281,105, filed May 17, 1963, by B. H. Van Horne, M. K. Detwiler and M. R. Zimmerman. This trend detector is comprised of a second recording pen being attached to a first recording pen mounted on an expanded scale type recorder in such a manner that it draws a line parallel to a line drawn by the first recording pen, providing the relationship between the two variables being recorded is constant. Thus, if the trend of the pressure on a structural member changes from a constant relationship with the trend of the quantity of fluid introduced into the hydraulic cylinder at any time, the line drawn by the second pen deviates from the previously-drawn line and the change of configuration in the lines is clearly discernible.

The instant method can be terminated automatically upon reaching the elastic limit of the structural member by mechanical or electrical means, for example, by shutting off the power supply to the pump or discontinuing the fluid supply to the pump. Methods which would automatically terminate the instant testing method include the use of mechanical means such as pressure-volume controls, valve mechanisms and the like as understood by one skilled in the art.

Ordinarily, the pressure pump which is used in the instant invention will be of the "constant delivery" type for ease in recording test data. By "constant delivery type" pump is meant a pump which delivers fluid at a constant rate. However, other types of pumps may also be employed provided delivery rate is known and taken into account.

When using a constant delivery rate pump, pumping time is directly proportional to the amount of fluid pumped and this time can be recorded instead of amount. Pumps not delivering at a constant rate can be used in a system employing an autographic (X–Y) recorder. In the latter case, by passing the fluid (liquid) through a flow meter, volume pumped is detected. This volume readily is translatable by known quantity transducer means into an electrical voltage or other signal which in turn can be used to drive one of the coordinates of the recording chart.

The detection of internal pressure in said hydraulic cylinder against the piston face during the pressurizing period can be realized by use of a pressure transducer. The term "transducer," as used herein, means a device activated by power from one system and supplying power to a second system. The pressure transducer can be made up of a combination of a pressure-detecting means and a pressure analyzing means.

Pressure-detecting means which can be utilized in the pressure transducer can be selected from a wide variety of such detectors including, for example, Bourdon-tube pressure gages, dead-weight piston gages, manganin wire pressure indicators, strain gages, piezoelectric crystals, differential transformers and manometers.

Useful pressure analyzers which can be employed are those which can translate and convert the impulse received from a given pressure detector into electrical, magnetic, mechanical or other optical equivalent thereof for further transmission to the recorder. Potentiometers with driving voltage, Wheatstone-bridges, differential transformers and amplified photovoltaic devices are examples of particularly useful pressure analyzers.

Recorders used in the method of the instant invention can be, for example, conventional single or multipoint autographic line recorders, memory type oscilloscopes with attached camera or other photographic recording means and magnetic recorders. The selection of a given recorder for use in a specific embodiment of the instant apparatus will be governed by the type of pressure transducer system used in the pressure testing method.

Typical useful pressure transducer and recorder assemblies are, for example, (1) a Bourdon-tube pressure gage, microtorque potentiometer with driving voltage and a Varian (0–10 M.V.) recorder; (2) a wire strain gage, Wheatstone-bridge and Wheelco standard line recorder; (3) a piezoelectric crystal, with amplifier, and a Leeds and Northrup single point recorder; (4) differential transformer and Brown recorder; (5) manometer, photovoltaic cell for following manometer fluid movement with change in pressure, amplifier and a Texas Instrument line recorder; (6) strain gage, Wheatstone-bridge, amplifier and magnetic recorder; (7) manometer, with metallic fluid or having a piece of metal placed on top of a non-metallic fluid, the manometer being centered within a coil (thus making a differential transformer assembly) and an autographic (X–Y) recorder; and (8) Bourdon-tube pressure gage, differential transformer and a slow-acting memory type oscilloscope with attached camera.

Ordinarily, substantially incompressible liquids will be used as the fluid to drive the pressure applying piston as these provide the optimum degree of sensitivity to pressure changes within the hydraulic cylinder as, for example, water, petroleum distillates, mineral oils, synthetic high pressure lubricants, chlorinated hydrocarbons, fluorochloro-substituted hydrocarbons, low-boiling hydrocarbons, glycols and the like liquid materials. However, fluids of known compressibility including both liquids and gases can be used in the instant apparatus and method although when using these, the sensitivity of the test may be reduced.

Although the invention has its prime utility in the non-destructive testing of structural members, it is to be understood that, if desired, the present means of testing can be used to actually test a prototype of a given structural member design, either to destruction or up into the range where said member undergoes plastic deformation, in order to determine the range wherein such structural members can be used without incurring damage. From such testing, a record of the working pressure is obtained which can be used in the hydraulic device in testing other structural members of the same type.

Additionally, it can be seen that with the instant invention, structural members can be tested to a preselected load, thereby determining whether a given structural member is within its elastic limit when operating at this load.

The instant invention and apparatus finds particular utility in the non-destructive testing of tension, compression, shear of structural members, including rods, bars, wire, cables, reinforced beams, columns, poles, brackets and the like. In addition, the instant invention can be used advantageously in testing a composite structure as a whole, for example, an airplane wing, without destruction of any one of its components and in routine checks of airplane parts, for example, landing gear. The instant invention and apparatus can also be used in connection with the manufacture of prestressed reinforced structures, for example, prestressed concrete beams in which the reinforcing members are desirably stressed to the maximum safe limits before and while the concrete sets.

Various modifications can be made in the instant invention without departing from the spirit or scope thereof, for it is to be understood that I limit myself only as defined in the appended claims.

What is claimed is:

1. An apparatus for the non-destructive testing of a structural member which comprises:

(a) a pump for delivery of fluid under pressure;

(b) a fluid supply for said pump;
(c) a hydraulic cylinder and piston combination, said piston slidably engaging the inner walls of said hydraulic cylinder, said cylinder and piston combination being of sufficient strength for it to take the pressure imposed on each element of said combination without reaching the elastic limit of each element of the combination and said hydraulic cylinder being in communication with said pump;
(d) means to apply the force of the movement of the piston to the structural member, thereby subjecting the member to a stressing action;
(e) support means to firmly hold in place said structural member to be tested;
(f) a pressure transducer;
(g) a quantity transducer; and
(h) a recorder, said pressure transducer being connected to said hydraulic cylinder and to said recorder, said quantity transducer being connected to said pump and to said recorder.

2. An apparatus for the non-destructive testing of structural members which comprises:
(a) a pump for delivery of fluid under pressure;
(b) a fluid supply for said pump;
(c) a hydraulic cylinder, piston and piston-rod combination, said piston slidably engaging the inner walls of said hydraulic cylinder and said cylinder, the combination of the piston and piston-rod being of sufficient strength for it to take the pressure imposed on each element of said combination without reaching the elastic limit of each element of the combination and said hydraulic cylinder being in communication with said pump;
(d) means to apply the force of the movement of the piston to the structural member, thereby subjecting the member to a stressing action;
(e) support means to firmly hold in place the structure to be tested;
(f) a pressure transducer;
(g) a quantity transducer; and
(h) a recorder, said pressure transducer being connected to said hydraulic cylinder and to said recorder, said quantity transducer being connected to said pump and to said recorder.

References Cited by the Examiner
UNITED STATES PATENTS

| | | | |
|---|---|---|---|
| 1,027,300 | 5/1912 | Wazau | 73—141 |
| 2,273,152 | 2/1942 | Sonntag | 73—90 |
| 2,670,624 | 3/1954 | Faris et al. | 73—100 X |
| 2,939,317 | 6/1960 | Mason | 73—134 |
| 3,057,190 | 10/1962 | Minke | 73—89 |
| 3,165,917 | 1/1965 | Wogsland | 73—88 X |
| 3,166,934 | 1/1965 | Kruse et al. | 73—95 X |

RICHARD C. QUEISSER, *Primary Examiner.*

J. J. SMITH, *Assistant Examiner.*